United States Patent [19]

Bräunling et al.

[11] 4,096,007

[45] Jun. 20, 1978

[54] IMPREGNATING FLUID-PERMEABLE ADHESIVE TAPE OR FOIL FOR FIXING COILED ELECTRICAL CONDUCTORS

[75] Inventors: Erhard Bräunling; Karl D. Kuhlmann; Peter Lutz, all of Hamburg, Germany

[73] Assignee: Beiersdorf Aktiengesellschaft, Hamburg, Germany

[21] Appl. No.: 760,512

[22] Filed: Jan. 19, 1977

Related U.S. Application Data

[63] Continuation of Ser. No. 553,777, Feb. 27, 1975, abandoned.

[30] Foreign Application Priority Data

Feb. 27, 1974 Germany .............................. 2409297

[51] Int. Cl.² .......................... B32B 3/10; B32B 3/16; B32B 7/14; C09J 7/04; H01B 13/30

[52] U.S. Cl. .................................. 156/55; 174/120 C; 174/120 SR; 428/40; 428/138; 428/195; 428/196; 428/255; 428/261; 428/343; 428/352

[58] Field of Search ............... 428/255, 343, 261, 195, 428/196, 352, 138, 40; 156/55; 174/120 C, 120 SR; 242/6, 7.03, 7.08

[56] References Cited

U.S. PATENT DOCUMENTS

| | | | |
|---|---|---|---|
| 2,510,120 | 6/1950 | Leander | 428/343 |
| 2,861,006 | 11/1958 | Salditt | 428/343 |
| 2,882,183 | 4/1959 | Bond et al. | 174/120 SR |
| 2,940,868 | 6/1960 | Patchell | 428/343 |
| 3,085,572 | 4/1963 | Blackford | 428/343 |
| 3,149,019 | 9/1964 | Skotnicki et al. | 156/55 |
| 3,307,690 | 5/1967 | Bond et al. | 428/40 |
| 3,364,063 | 1/1968 | Satas | 428/343 |
| 3,542,634 | 11/1970 | Suck et al. | 428/343 |
| 3,632,412 | 12/1972 | Blance et al. | 428/261 |

*Primary Examiner*—J.C. Cannon
*Attorney, Agent, or Firm*—Bierman & Bierman

[57] ABSTRACT

An adhesive tape is disclosed which is useful for binding electrical conductors. The tape is liquid-permeable so that the conductors can be impregnated with liquids such as varnishes and resins. It comprises a liquid-permeable support material, one side of which is coated with an adhesive. The adhesive covers less than 50% of the coated side.

6 Claims, 1 Drawing Figure

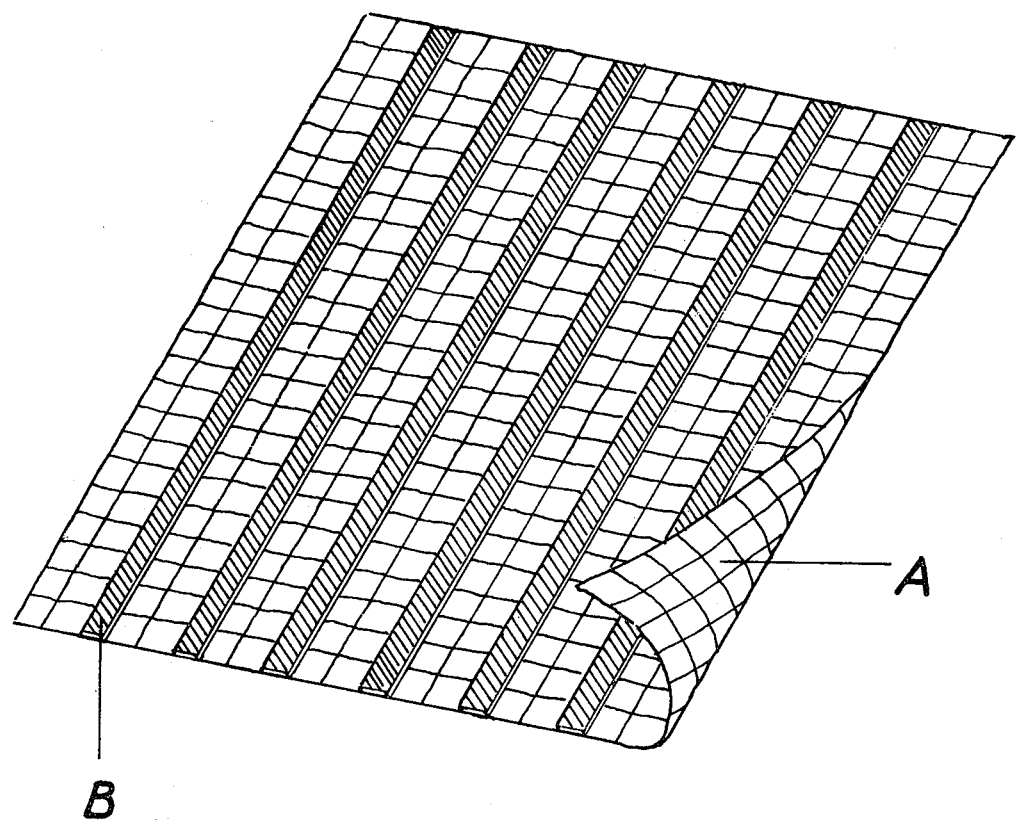

IMPREGNATING FLUID-PERMEABLE ADHESIVE TAPE OR FOIL FOR FIXING COILED ELECTRICAL CONDUCTORS

This is a continuation application of Ser. No. 553,777 filed on Feb. 27, 1975, now abandoned, and which claims the priority of German application No. P 2,409,297.5 filed on Feb. 27, 1974.

The present invention refers to an impregnating-fluid permeable adhesive tape or foil for fixing of wires of coil-like electrical conductors, and is fully permeable to the customary impregnating fluids or compounds.

In the electrical industry, coils of transformers, electrical appliances, or of electrical equipment are provided, after winding, with impregnating fluids; for example, by immersion or dropwise. These impregnating varnishes or resins serve to maintain the functional capacity of electric materials over a lengthy period, since they represent an additional electrical insulation, and offer protection against mechanical injuries of wires, and against thermal and chemical effects.

Prior to treatment with impregnating fluids, the coiled wires, must be bound or fixed, so that the relative positions of the individual wires are maintained. Fixing aids that have been common in technology for a long time are primarily: wires, yarns, tapes, in particular, textile tapes (see F. Heiles, "Windings of Electric Machines, and Their Manufacture", Springer (1953) Page 114), which are extensively secured at a certain distance from each other, around the coiled wires. An efficient fixing and binding of the coil is complicated and time-consuming in applying this known device.

For the fixing and wrapping of coiled conductors, besides the described fixing aids, adhesive tapes have also been suggested. These must conform to special requirements regarding durability. Thus, for example, a fully coated tape is described in U.S. Pat. No. 3,307,690, which, due to its resistance to humidity and temperature changes, as well as its stability as to oils (transformer oils), is suitable for wrapping transformers. In addition, an insulating and electrical conductor-fixing, coated splicing tape is disclosed in U.S. Pat. No. 3,632,412. This tape retains its adhesive power at high thermal stress of the electric equipment that it is used with, and does not corrode metallic conductors, showing a good stability against organic solvents and oils.

Although, according to the shown technology level, a satisfactory and durable fixing or taping of wire coils can be achieved, the above-mentioned fixing aids are impractical where, subsequent to fixing, impregnation varnishing of the coils is to be carried out. The use of the coils depends essentially on a substantially complete impregnation. Moreover, care must be taken to avoid entrapment of air bubbles in the hardened varnish. These lead to short circuits. If the coils are fixed or taped with liquid-impermeable tapes, such as those disclosed in the above patents which are fully coated with adhesive, this problem exists.

The process of impregnation varnishing, using known fixing aids, moreover, requires a costly expenditure of energy and is time-consuming, because the impregnation must be carried out using vacuum techniques, and there is still no guarantee that no undesirable air pockets will not form in the area of the coiled wires.

Therefore, it was an object of the research which let to the present invention to develop a fixing material for electrical conductor coils, which would not possess the above-mentioned disadvantages, and yet allow complete impregnation of the coils with impregnating fluids.

Accordingly, the present invention is directed to an impregnating fluid-permeable, pliant adhesive tape or foil, which until its use can be covered with an adhesive-repellant separating paper, for the fixing of coiled electrical conductors, comprising an impregnating fluid-permeable carrier material, the adhesion side of which is at least 50% free of adhesive compound.

The use of the present tape or foil can be carried out both by separated or overlapping wrapping. The wrapped coils together with the tape of the present invention, can be impregnation varnished, and the time required for this process can be substantially reduced. Further, impregnation with vacuum techniques can be dispensed with in most cases, because the hazard of forming air pockets is virtually eliminated. The invention material can also, if required, be used by itself as a spacer between particular conductors or conductor layers, while withing the vicinity of the coil, good heat exchange and unhindered air circulation are enabled.

A preferred embodiment of the present invention is illustrated in the Figure. It comprises:

A. a pliant impregnating fluid-permeable support, which, for example, is an open-meshed woven fabric or textile, a coarse-pored non-woven fabric, or a stamped non-woven fabric with a netlike structure, and B. a self-adhesive compound coated on the support material in fine strips or particles in such a manner that at least 50% of the side to which the adhesive gluing compound is applied remains free of the adhesive.

The carrier material of the tape is preferably chosen from materials having a good temperature stability, and which do not undergo any change of their properties up to about 120° C. Examples of such materials are polyesters, polyester-polyamides, and polyamides. The support should also be flexible, and pliant, and not exceed about 0.3 mm. in thickness.

In accordance with the oil, solvent, and temperature resistance requirements, the adhesive compound can be based on a conventional natural-rubber compound, a synthetic-rubber compound, polyacrylate or silicon rubber, or heat-crosslinked compounds thereof.

By "polyacrylate" is meant homo-and copolymers of acrylic acid esters, in particular high esters such as n-butylacrylate or 2-ethyl-hexyl-acrylate. Preferable are copolymers of acrylic acid esters with small quantities of such reactive monomers which can be cross-linked with or without the addition of cross-linking means or catalysts. In this manner solubility of the adhesives is largely diminished so that they are virtually unaffected by the impregnating process, and the desired properties of the impregnating preparations remain unaltered.

An adhesive compound of high adhesive power must be chosen, because, in contrast to uniformly coated adhesive tapes, reliable adhesion must result from a largely reduced surface area. The adhesive components of the present invention may also contain commonly known additives such as fillers, antioxidants, or vulcanization aids.

The adhesive is usually applied in straight-lined or sinusoidal strips or in separate globules or points instead of over the full surface of the support backing. Hence, it is now possible to apply sufficient adhesive for reliable adhesion while simultaneously obtaining excellent impregnation permeability. Several preferred embodiments of the present invention are described in the following examples.

EXAMPLE 1

The adhesive tape consists of a coarse-meshed polyester fabric with a mesh space of 0.3 mm, the meshes of which are fixed at intersection points by a polyester resin, and self-adhering acrylate-based adhesive. The striped coating of this compound covers 50% of the fabric area. The width of the strips is about 1 mm, the coating thickness about 50 g/m$^2$.

EXAMPLE 2

A coarse-non-woven polyester fabric with netlike structure, and which has been punched with ellipse-shaped holes, has the bore diameter (of the ellipses) $a = 4$ mm, $b = 2$ mm. Its weight per unit area is 60 g/square meter, the thickness 0.25 mm. It is provided with about 1-mm-wide strip lines of a heat crosslinked, natural rubber compound, the strips having 1-mm spacing from each other. The adhesive coating quantity is about 50 g/square mehr.

Because of the better storage capacity and workability of this material, the adhesive side of the tape is preferably coated with adhesive-repellant separating paper.

What is claimed is:

1. A method of binding coiled electrical conductors comprising applying to said conductors an adhesive tape consisting essentially of a pliant and liquid-permeable support material and a self-adhesive composition coated on one side of said support and covering up to 50% of said side, said composition being selected from the group consisting of heat-crosslinked natural or synthetic rubber, heat-crosslinked silicon rubber or heat-crosslinked polyacrylate.

2. The method of claim 1 in which the support material is an open-meshed woven fabric, a coarse-pored non-woven fabric, or a continuous non-woven fabric having a multitude of holes stamped therethrough.

3. The method of claim 1 in which the adhesive composition coating is in the form of strips.

4. The method of claim 1 in which the adhesive composition coating is in the form of separate points.

5. The method of claim 1 in which the adhesive side of the support is covered with an adhesive-repellant release coating.

6. The method of claim 2 in which the support material is a polyester, a polyester-polyamide or a polyamide.

* * * * *